United States Patent
Olofsson

(10) Patent No.: US 10,243,886 B2
(45) Date of Patent: *Mar. 26, 2019

(54) BI-DIRECTIONAL NAT TRAVERSAL USING ENDPOINT ASSIGNED DISCRIMINATORS

(71) Applicant: Cisco Technology, Inc., San Jose, CA (US)

(72) Inventor: Lars Olof Stefan Olofsson, Dubai (AE)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/806,186

(22) Filed: Nov. 7, 2017

(65) Prior Publication Data

US 2018/0063033 A1    Mar. 1, 2018

Related U.S. Application Data

(63) Continuation of application No. 15/243,897, filed on Aug. 22, 2016, now Pat. No. 9,819,613, which is a
(Continued)

(51) Int. Cl.
*H04L 29/06* (2006.01)
*H04L 12/935* (2013.01)
(Continued)

(52) U.S. Cl.
CPC ...... *H04L 49/3009* (2013.01); *H04L 61/2582* (2013.01); *H04L 63/02* (2013.01); *H04L 63/029* (2013.01); *H04L 29/0653* (2013.01); *H04L 43/50* (2013.01); *H04L 49/309* (2013.01); *H04L 61/2514* (2013.01)

(58) Field of Classification Search
CPC . H04L 43/50; H04L 29/0653; H04L 49/3009; H04L 49/309; H04L 63/02
See application file for complete search history.

(56) References Cited

U.S. PATENT DOCUMENTS 7,554,983 B1    6/2009  Muppala
8,046,829 B2   10/2011  Oba
(Continued)

*Primary Examiner* — Jay P Patel
(74) *Attorney, Agent, or Firm* — Polsinelli PC

(57) ABSTRACT

A method for creating a secure link between any two endpoints in a network comprises: assigning a unique identifier to each endpoint of a network; for each endpoint in the network, transmitting the unique identifiers associated with each of the remaining endpoints in the network to said endpoint; establishing a secure link between a source endpoint and a destination comprising: transmitting a data-session establishment packet from the source endpoint to the destination endpoint via a symmetric NAT device; wherein the data-session establishment packet comprises the unique identifier associated with the source endpoint; performing a matching operation at the destination endpoint to match the unique identifier associated with the source endpoint with a unique identifier known to the destination endpoint; and upon matching of unique identifiers then creating a forwarding table entry for the destination endpoint based on the source address and source port associated with the source endpoint.

20 Claims, 7 Drawing Sheets

Related U.S. Application Data continuation of application No. 14/146,683, filed on Jan. 2, 2014, now Pat. No. 9,450,915.

(51) Int. Cl.
*H04L 29/12* (2006.01)
*H04L 12/26* (2006.01)

(56) References Cited

U.S. PATENT DOCUMENTS

| | | | |
|---|---|---|---|
| 8,825,822 | B2 | 9/2014 | Boire-Lavigne et al. |
| 8,972,543 | B1 | 3/2015 | Park |
| 9,237,147 | B2* | 1/2016 | Snow ............... H04N 21/41407 |
| 9,893,931 | B2* | 2/2018 | Hu ....................... H04L 41/0668 |
| 2001/0034759 | A1* | 10/2001 | Chiles ................. H04L 12/4633 |
| | | | 709/203 |
| 2003/0191843 | A1 | 10/2003 | Balissat et al. |
| 2003/0219022 | A1 | 11/2003 | Dillon et al. |
| 2006/0077988 | A1* | 4/2006 | Cheng ............... H04L 29/12009 |
| | | | 370/401 |
| 2007/0208854 | A1 | 9/2007 | Wiryaman et al. |
| 2008/0107124 | A1 | 5/2008 | Ros-Giralt |
| 2010/0205313 | A1 | 8/2010 | Boire-Lavigne et al. |
| 2013/0343379 | A1 | 12/2013 | Stroud et al. |
| 2014/0237585 | A1 | 8/2014 | Khan et al. |
| 2015/0095648 | A1 | 4/2015 | Nix |
| 2016/0112250 | A1* | 4/2016 | Hu .......................... H04L 67/16 |
| | | | 370/216 |

* cited by examiner

Different NAT Behaviors: Translation Entry Creation

| NAT Type | Inside | Outside | Direction (enters from) |
|---|---|---|---|
| Endpoint Independent | Inside Src IP:Src Port | Outside Src IP:Inside Src Port | Any Src IP:Any Src Port |
| Address Restricted | Inside Src IP:Src Port | Outside Src IP:Inside Src Port | Orig Dst IP:Any Port |
| Address/Port Restricted | Inside Src IP:Src Port | Outside Src IP:Inside Src Port | Orig Dst IP:Orig Dst Port |
| Symmetric | Inside Src IP:Src Port | Outside Src IP:Random Src Port | Orig Dst IP:Orig Dst Port |

BI-DIRECTIONAL NAT TRAVERSAL USING ENDPOINT ASSIGNED DISCRIMINATORS

CROSS-REFERENCE TO RELATED APPLICATIONS

This application is a continuation of U.S. application Ser. No. 15/243,897, filed on Aug. 22, 2016 which is a continuation of U.S. patent application Ser. No. 14/146,683 filed on Jan. 2, 2014. The foregoing patent applications are incorporated herein by reference.

FIELD

Embodiments of the present invention relate to networking.

BACKGROUND

Network Address Translation (NAT) traversal is a challenge in computer networking that has become a ubiquitous factor that must be taken into consideration when creating new protocols, technologies and services. In current networks, NAT is deployed as a means of security, address-space and network topology abstraction in addition to the originally intended purpose of extending diminishing IPv4 address space.

Because of the variety in applications of NAT as a technology, differing requirements has caused great divergence in how a NAT-function is implemented on a given network device. For example, some NAT implementations first and foremost consider security as primary objective, while others consider scalability as a primary objective. Regardless of the type of NAT implementation it remains a challenge for an application to operate transparently whether or not a NAT-device is present in the network transport path or not. This challenge is magnified in cases where multiple different types of NAT implementations must be considered concurrently and in combination. Such deployments are common in current networks and present a very real difficulty when trying to provide transparent connectivity for an application.

The common types of NAT-implementation are the following:
  a. Endpoint Independent (also know as Full Cone), establishes a translation entry between the inside private address and the outside public address and allows any incoming connection from the outside to be established with to the private address
  b. Address Dependent (also known as Restricted Cone), establishes a translation entry between the inside private address and the outside public address and only allows incoming connections from the outside originating from the address the original flow was using as the destination address.
  c. Address and Port Dependent (also known as Port-Restricted Cone), establishes a translation entry between the inside private address and the outside public address and only allows incoming connections from the outside originating from the address and upper layer protocol port the original flow was using as the destination address and port.
  d. Symmetric, establishes a translation entry between the inside private address and the outside public address where the outside upper layer protocol port is uniquely assigned to every Source Address/Port and Destination Address/Port flow that creates the translation entry in the NAT. Any incoming connection not exactly matching the outside Source Address/Port and Destination Address/Port is disallowed.

NAT Traversal through an Endpoint Independent NAT does not require any specific actions, but for the other types of NAT there are restrictions that can be handled in a variety of ways, but there is no single approach that can be used to ensure traversal through all the types of restricted NAT-implementations (Address Dependent, Address and Port Dependent, and Symmetric).

SUMMARY

According to a first aspect of the invention, there is provided a method for creating a secure link between any two endpoints in a network, said method comprising: assigning a unique identifier to each endpoint of a network; for each endpoint in the network, transmitting the unique identifiers associated with each of the remaining endpoints in the network to said endpoint; establishing a secure link between a source endpoint and a destination comprising: transmitting a data-session establishment packet from the source endpoint to the destination endpoint via a symmetric Network Address Translation (NAT) device; wherein the data-session establishment packet comprises the unique identifier associated with the source endpoint; performing a matching operation at the destination endpoint to match the unique identifier associated with the source endpoint with a unique identifier known to the destination endpoint; and upon matching of unique identifiers then creating a forwarding table entry for the destination endpoint based on the source address and source port associated with the source endpoint.

Other aspects of the invention will be apparent from the detailed description below.

BRIEF DESCRIPTION OF THE FIGURES

FIG. 5 shows a table of filters for return traffic created by NAT devices in accordance with different NAT translation methods.

DETAILED DESCRIPTION

In the following description, for purposes of explanation, numerous specific details are set forth in order to provide a thorough understanding of the invention. It will be apparent, however, to one skilled in the art that the invention can be practiced without these specific details. In other instances, structures and devices are shown in block or flow diagram form only in order to avoid obscuring the invention. Accommodate Reference in this specification to "one embodiment" or "an embodiment" means that a particular feature, structure, or characteristic described in connection with the embodiment is included in at least one embodiment of the invention. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Moreover, although the following description contains many specifics for the purposes of illustration, anyone skilled in the art will appreciate that many variations and/or alterations to the details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon, the invention.

Broadly, embodiments of the present invention disclose a method and system for bi-directional NAT traversal within a network when one endpoint is located behind a symmetric NAT.

Figure 1:
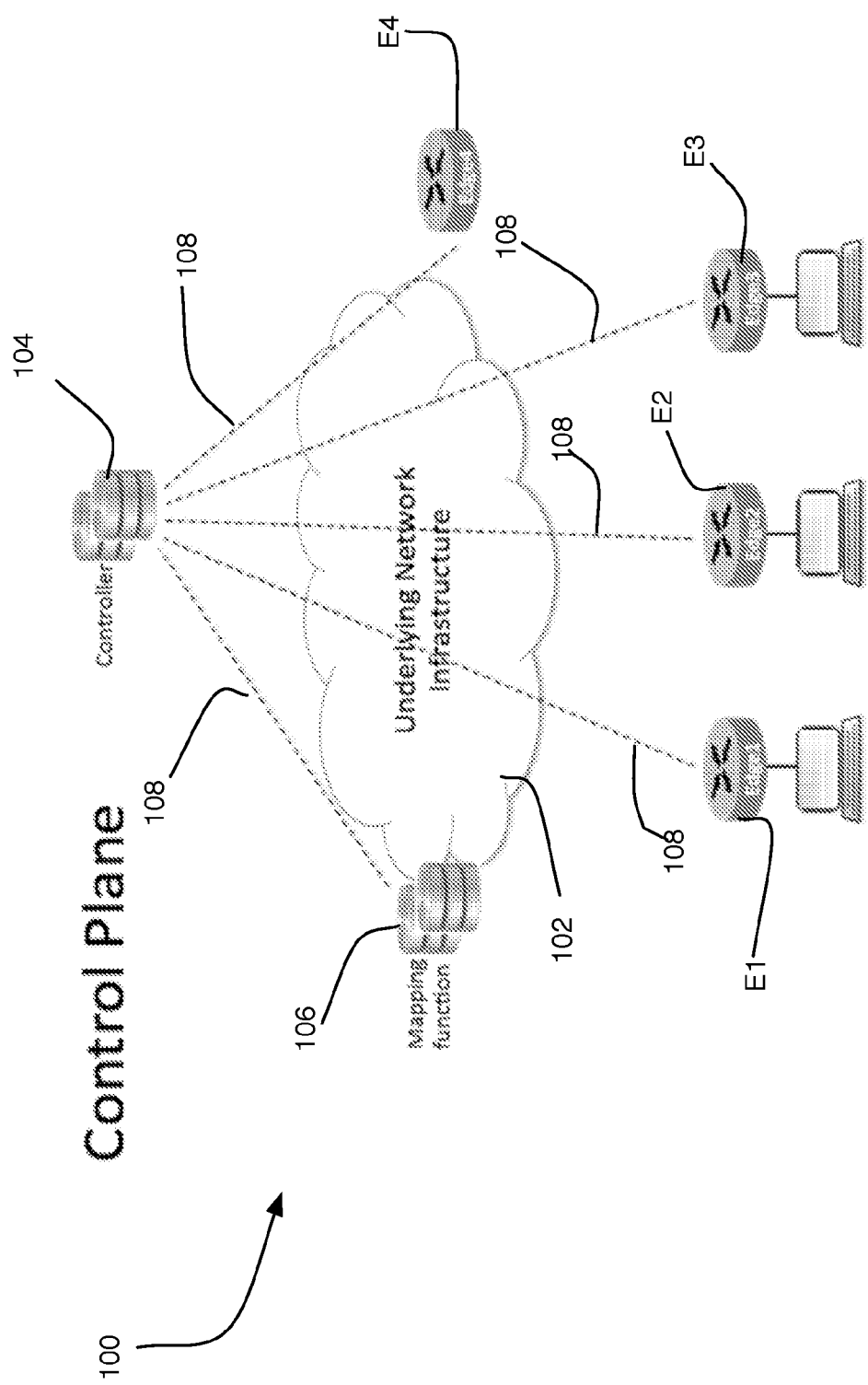
FIG. 1 shows a network 100 with a control plane, in accordance with one embodiment of the invention.

FIG. 1 shows a representative network 100 within which embodiments of the present invention may be practiced. Referring to FIG. 1, reference numeral 102 indicates underlying network infrastructure that may be used to connect endpoints/edges E1 to En together. In one embodiment, the endpoints/edges may represent branch office routers. In FIG. 1 only four edges are shown and are indicated as edges E1 to E4, respectively. However, it is to be understood that many more edges are possible in accordance with different embodiments.

The underlying network infrastructure 102 may include elements that form a Wide Are Network (WAN) and in some embodiments may include public and/or private infrastructure. For example, in one embodiment the underlying network infrastructure 102 may include the public Internet.

Figure 2:
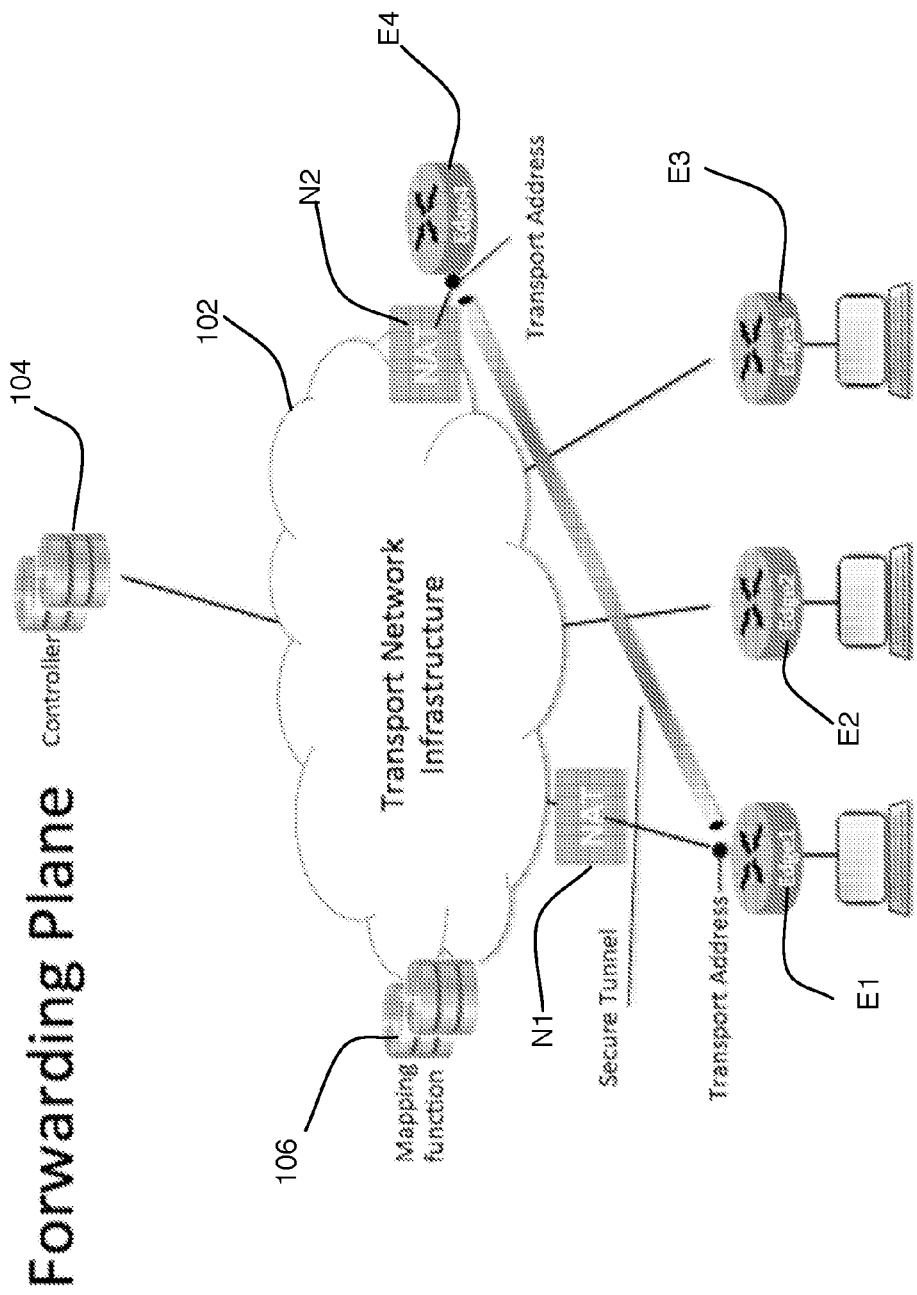
FIG. 2 shows a forwarding plane established in the network 100, in accordance with one embodiment of the invention.

By way of example consider that the edge E1 is to establish a data-plane connection with the edge E4. Assume that the edge E1 is located behind a symmetric NAT device N1 and that the edge E4 is located behind a NAT device N2. The devices N1 and N2 can be seen in FIG. 2 which show a forwarding plane established in the network 100.

The device N2 may be any type of NAT device except a symmetric NAT device. Thus, the NAT device N2 may be an Endpoint Independent device, an Address Restricted Device, or an Address Restricted/Port Restricted device. As one of ordinary skill in the art would appreciate translation table entries created by the NAT devices N1 and N2 will include filters for return traffic as indicated in the Table 500 shown in FIG. 5.

In one embodiment, a discriminator is assigned by or to each originating endpoint that serves to uniquely identify that endpoint. In the case of the example given above, the edge E1 is an originating endpoint for traffic from E1 to E4. Thus, in one embodiment, E1 may be provisioned with a discriminator to uniquely identify E1 in the network 100. In one embodiment, the discriminator may be similar to the discriminators used in the Bidirectional Forward Detection (BFD) protocol (IETF RFC5880).

In one embodiment, a control plane is established to all endpoints in the network. Techniques for establishing the control plane are using an Overly Management Protocol, are described in co-pending U.S. patent application Ser. No. 14/133,558 entitled "OVERLAY MANAGEMENT PROTOCOL FOR SECURE ROUTING BASED ON AN OVERLAY NETWORK" which is incorporated herein by reference in its entirety. The control plane serves as a distribution vehicle for the discriminators. In one embodiment, to facilitate the establishment of said control plane, the network 100 further comprises a controller 104 and a mapping server 106. The mapping server 106 supports a bring up method used to establish the control plane as is described in co-pending U.S. patent application Ser. No. 14/028,518 entitled "SECURE BRING-UP OF NETWORK DEVICES" which is incorporated herein by reference in its entirety. In one embodiment, the control plane is defined by secure control channels 108 between the controller 104 and the various edges in the network 100, and the between the controller 104 and the mapping server 106. In one embodiment, the channels 108 may comprise DTLS links.

Figure 3:
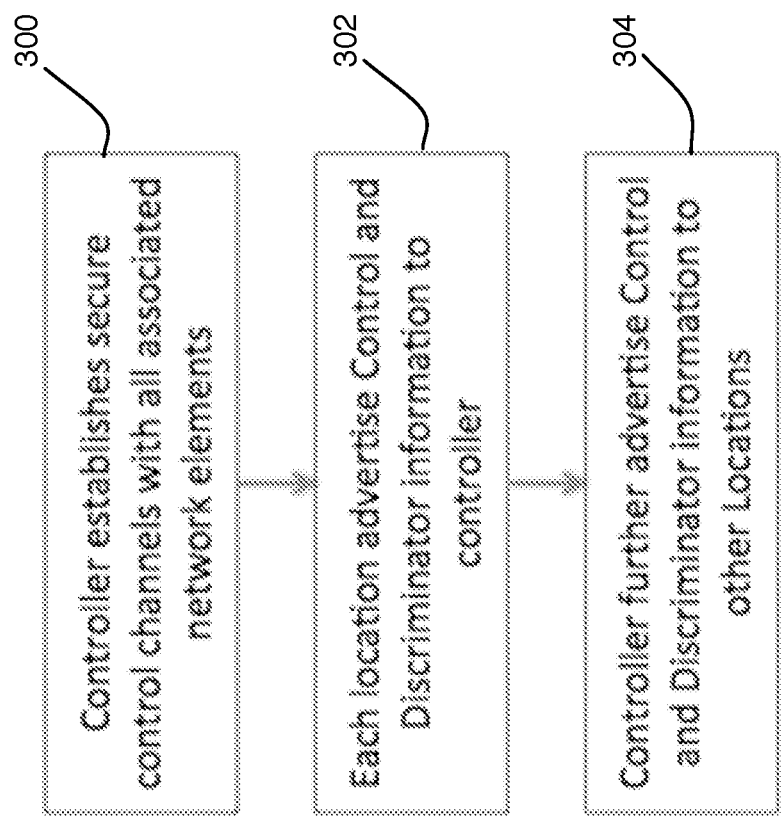
FIG. 3 shows an exemplary setup procedure for the network 100, in accordance with one embodiment of the invention.

The establishment of the control channels 108 is indicated by block 300 in FIG. 3, which shows an exemplary setup procedure, in accordance with one embodiment of the invention.

In one embodiment, each edge E1 to E4 uses its control channel 108 to the controller 104 to advertise local routing information to the central controller. 104. This is indicated by block 302 in FIG. 3. In one embodiment, the local routing information may comprise:

a) A Transport Address, e.g. in the form of an IPv4-address, and an Upper Layer protocol port, used as a next-hop address for the other components of the routing table advertised by the node. In one embodiment, the Transport Address consists of information representing the node on the inside and also on the outside of a potential NAT-device, post translation.

b) In one embodiment, included and associated with the Transport Address is also a Discriminator value that is persistent in the distribution of information across the control plane elements; and c) Service routing information pertaining to each local branch office.

Continuing with FIG. 3, at block 304, the controller 104 advertises the local routing information with each of the edges E1 to E4 via the control plane channels 108.

In one embodiment, each branch office router (edge E1 to En) assumes that other branch office routers can be reached using the outside information carried as part of the external identifier, which will be true in a significant portion of the cases. However, this is not true for all cases and this is where the discriminator is used, as will be explained later.

In one embodiment, as part of initial session establishment, a protocol, such as BFD (IETF RFC5880), is used to form a data-plane connection between the devices. This protocol will carry the discriminator value identifying the source of the traffic as part of its header. In the standard case, the external identifier alone will be enough for the receiving end to identify the source, but this does not apply to cases where a NAT device using a symmetric translation operation is deployed.

Figure 4:
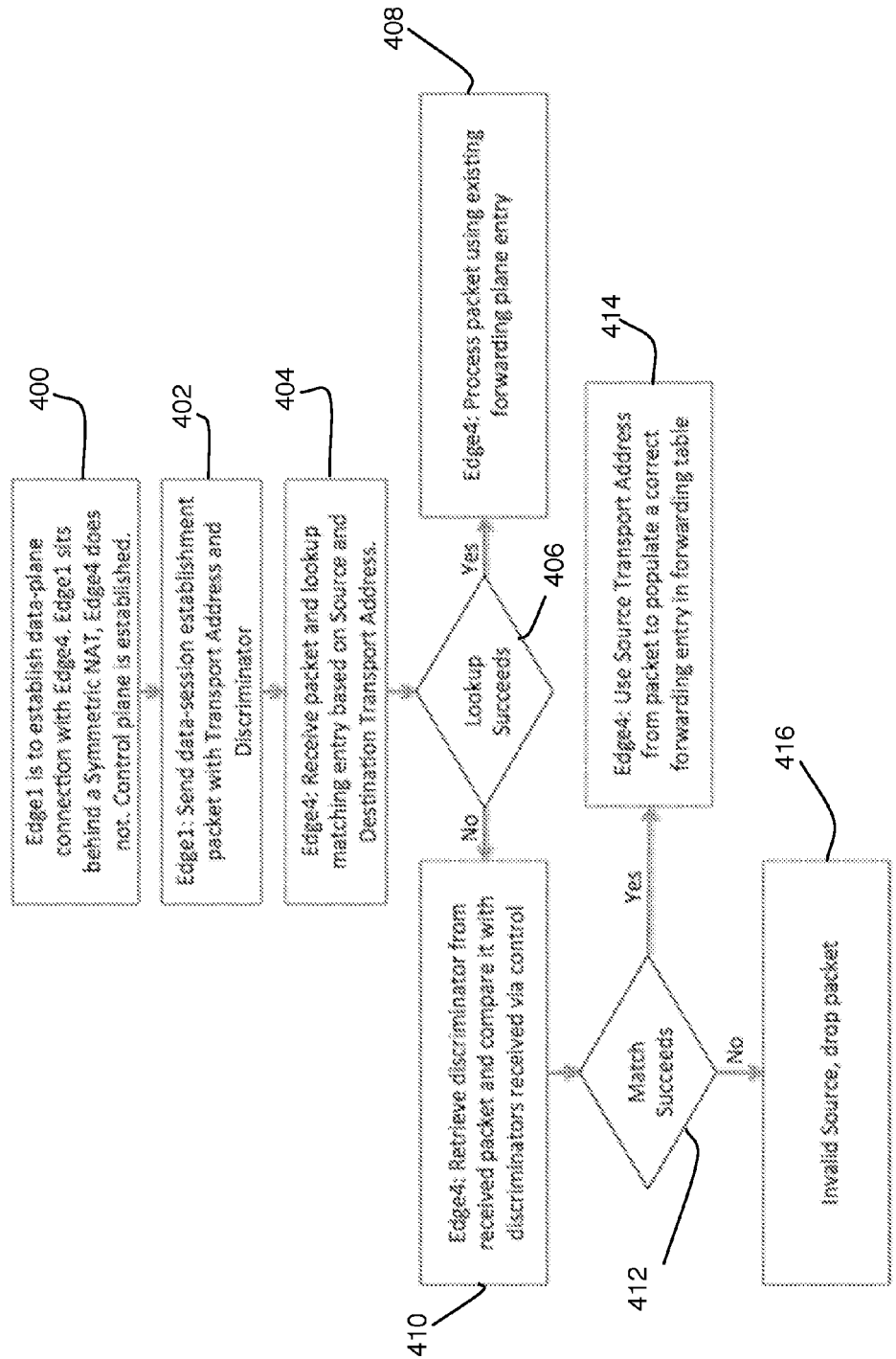
FIG. 4 shows the processing steps for establishing communications between an edge E1 located behind symmetric NAT device and an edge E4, in accordance with one embodiment of the invention.

In one embodiment, for session establishment to function where one end is using a symmetric NAT device, the receiving end receives and processes a packet only to determine the part of the external identifier does not match what has previously been learnt through the control plane protocol. In this case, the receive packet process continues to apply the following steps:
 a) Examine the source discriminator of the received packet
 b) Match the source discriminator with the discriminators received via the control plane to determine the correct source of the packet
 c) Take the portions needed from the Transport Address, Source IP/Source Port, as carried in the IP-header of the received packet
 d) Use these discovered fields to complete a forwarding table entry for the given destination
 e) A complete data-plane path is now established FIG. 4 shows the processing steps for communications between the edge E1 and the edge E4 based on the techniques disclosed above. It will be recalled that the edge E1 which sits behind the symmetric NAT device N1 is to establish a data-plane session with the edge E4 which located behind the NAT device N2 which supports any type on NAT translation method except symmetric NAT translation. To begin, at block 400, E1 establishes a control channel with to controller 104 and sends and receives control and routing information to/from the controller 104 as described above. At block 402, E1 sends a data-session establishment packet with its Transport Address and Discriminator to the edge E4. At block 404, the data-session establishment packet is received by the edge E4 and a lookup is performed by the edge E4 for a matching entry in its forwarding table based on the Source and Destination Transport Address. At block 406, if said lookup succeeds then control passes to block 408 where the received packet is processed using the existing forwarding table entry. If at block 406, the lookup fails, then at block 410, the edge E4 retrieves the discriminator in the received packet and compares it with discriminators previously received from the controller 104, at block 412. If the discriminator in the received packet matches one of the discriminators previously received from the controller 104, then block 414 executes, otherwise the received packet is dropped at block 416 due to the source endpoint for the packet being invalid or unidentifiable. In one embodiment, processing at block 414 includes using the Source Transport Address associated with the received packet to populate a forwarding entry in the forwarding table associated with the edge E4 thereby to create a valid tunnel to the edge E1.

In one embodiment, the controller 104 may independently assign and distribute the discriminators used to each device. This guarantees discriminator uniqueness across a set of devices of any size.

Figure 6:
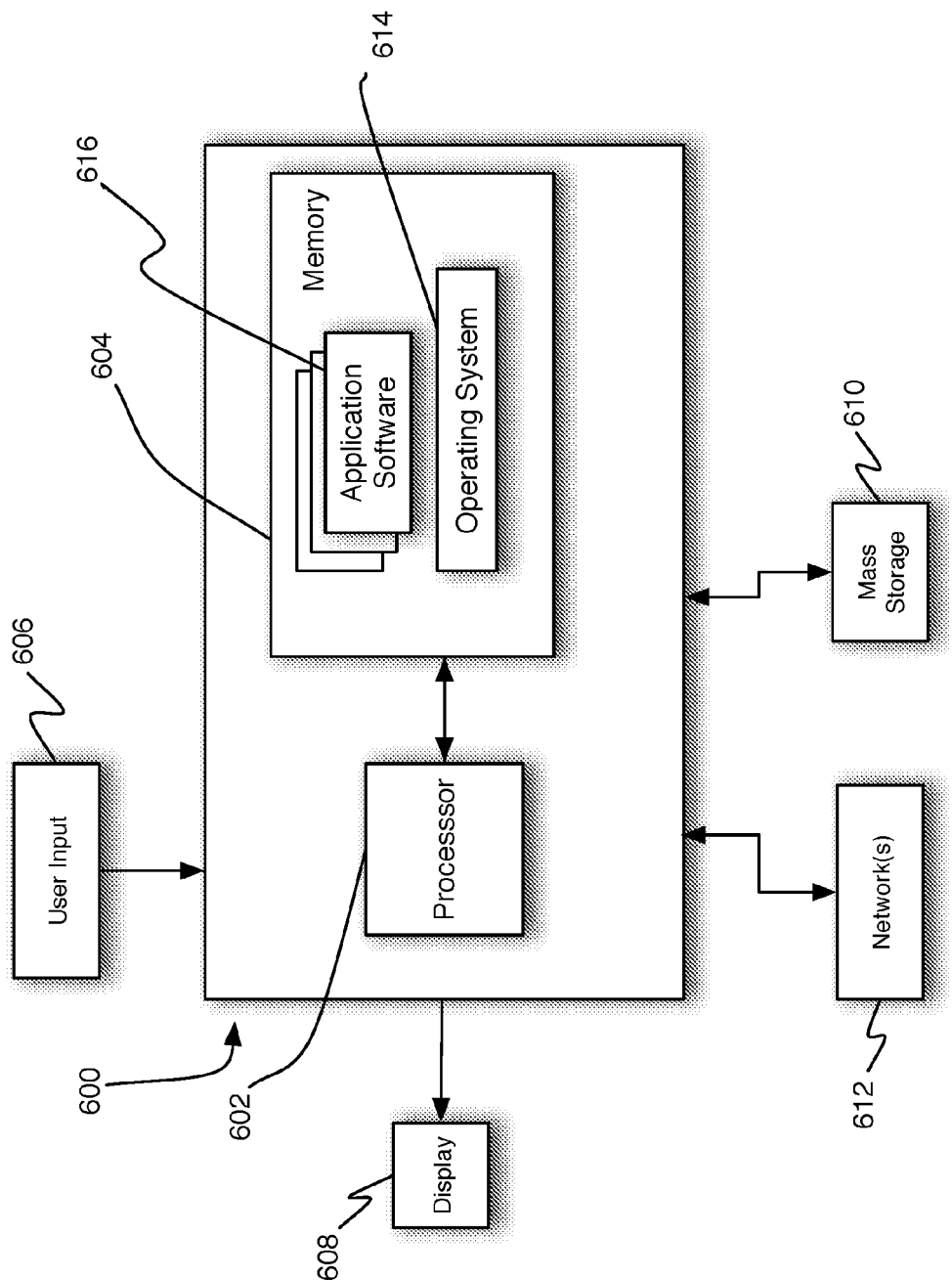
FIG. 6 shows a high-level block diagram for a controller and mapping server, in accordance with one embodiment of the invention.

FIG. 6 shows an example of hardware 600 that may be used to implement the controller 104 and the mapping server 106, in accordance with one embodiment. The hardware 600 may includes at least one processor 602 coupled to a memory 604. The processor 603 may represent one or more processors (e.g., microprocessors), and the memory 604 may represent random access memory (RAM) devices comprising a main storage of the hardware, as well as any supplemental levels of memory e.g., cache memories, non-volatile or back-up memories (e.g. programmable or flash memories), read-only memories, etc. In addition, the memory 604 may be considered to include memory storage physically located elsewhere in the hardware, e.g. any cache memory in the processor 602, as well as any storage capacity used as a virtual memory, e.g., as stored on a mass storage device.

The hardware also typically receives a number of inputs and outputs for communicating information externally. For interface with a user or operator, the hardware may include one or more user input output devices 606 (e.g., a keyboard, mouse, etc.) and a display 608. For additional storage, the hardware 600 may also include one or more mass storage devices 610, e.g., a Universal Serial Bus (USB) or other removable disk drive, a hard disk drive, a Direct Access Storage Device (DASD), an optical drive (e.g. a Compact Disk (CD) drive, a Digital Versatile Disk (DVD) drive, etc.) and/or a USB drive, among others. Furthermore, the hardware may include an interface with one or more networks 612 (e.g., a local area network (LAN), a wide area network (WAN), a wireless network, and/or the Internet among others) to permit the communication of information with other computers coupled to the networks. It should be appreciated that the hardware typically includes suitable analog and/or digital interfaces between the processor 612 and each of the components, as is well known in the art.

The hardware 600 operates under the control of an operating system 614, and executes application software 616 which includes various computer software applications, components, programs, objects, modules, etc. to perform the techniques described above.

In general, the routines executed to implement the embodiments of the invention, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, USB and other removable media, hard disk drives, optical disks (e.g., Compact Disk Read-Only Memory (CD ROMS), Digital Versatile Disks, (DVDs), etc.), flash drives among others.

Figure 7:
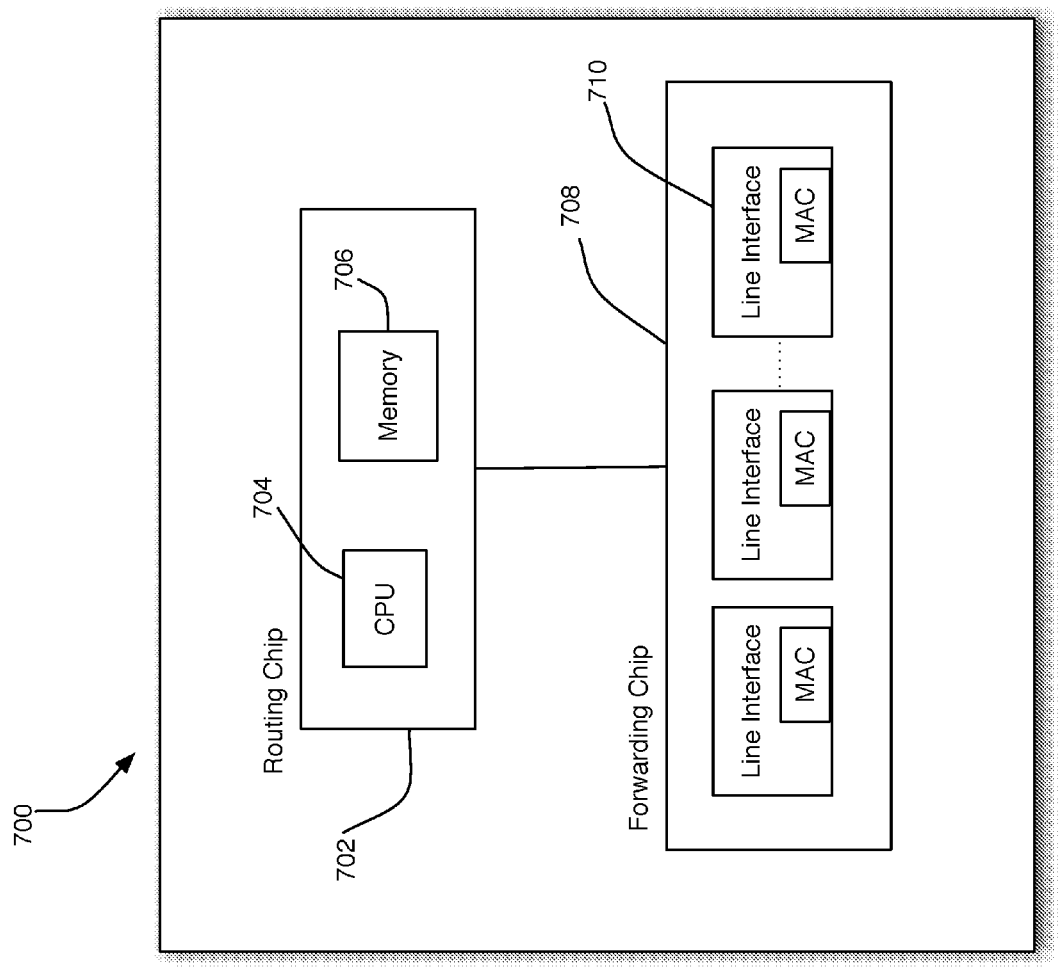
FIG. 7 shows a high-level block diagram of hardware for a router/endpoint, in accordance with one embodiment of the invention.

FIG. 7 shows a block diagram of hardware 700 for edge routers E1-En and ma described above, in accordance with one embodiment of the invention. Referring to FIG. 7, the hardware 700 includes a routing chip 704 coupled to a forwarding chip 708. The routing chip 704 performs functions such as path computations, routing table maintenance, and reachability propagation. Components of the routing chip include a CPU or processor 704, which is coupled to a memory 706. The memory stores instructions to perform the methods disclosed herein. The forwarding chip is responsible for packet forwarding along a plurality of line interfaces 710.

Although the present invention has been described with reference to specific exemplary embodiments, it will be evident that the various modification and changes can be made to these embodiments without departing from the broader spirit of the invention. Accordingly, the specification and drawings are to be regarded in an illustrative sense rather than in a restrictive sense.

What is claimed is:

1. A method for creating a secure link between two endpoints in a network, the method comprising:

transmitting a data-session establishment packet from a source endpoint to a destination endpoint via a device configured to translate addresses from a public network address to a private network address, wherein the data-session establishment packet comprises a unique identifier associated with the source endpoint;

performing a matching operation at the destination endpoint to match the unique identifier associated with the source endpoint with a unique identifier known to the destination endpoint;

upon a successful matching of the unique identifier associated with the source endpoint with the unique identifier known to the destination endpoint, creating a forwarding table entry for the destination endpoint based on a source address and source port associated with the source endpoint.

2. The method of claim 1, further comprising dropping the data-session establishment packet upon an unsuccessful matching of the retrieved unique identifier with the unique identifier known to the destination endpoint.

3. The method of claim 1, further comprising assigning, by a controller, the unique identifier to the source endpoint.

4. The method of claim 1, wherein each unique identifier comprised in the data-session establishment packet comprises a discriminator as defined in Bidirectional Forward Detection (BFD) protocol.

5. The method of claim 3, further comprising transmitting from the source endpoint and the destination endpoint respective unique identifiers via a control plane established between each endpoint and the controller.

6. The method of claim 5, further comprising establishing the control plane with the controller.

7. The method of claim 6, wherein the control plane is defined by secure control channels.

8. The method of claim 7, wherein each endpoint of the network advertises respective local routing information to the controller via the secure control channels.

9. The method of claim 8, wherein the controller further advertises respective local routing information of a given endpoint with each of other endpoints in the network.

10. An edge router, comprising:

a communication component;

one or more processors coupled to the communication component; and one or more non-transitory computer-readable media containing instructions that, when executed by the one or more processors, cause the edge router to perform or control performance of operations, the operations comprising:

receive, via the communication component, a data-session establishment packet transmitted by a source endpoint via a device configured to translate addresses from a public network address to a private network address, wherein the data-session establishment packet comprises a unique identifier associated with the source endpoint;

perform a matching operation to match the unique identifier associated with the source endpoint with a unique identifier stored in the computer-readable media of the edge router;

upon a successful matching of the unique identifier associated with the source endpoint with the unique identifier stored in the computer-readable media, create a forwarding table entry for the edge router based on a source address and source port associated with the source endpoint.

11. The edge router of claim 10, the operations further comprising drop the data-session establishment packet upon an unsuccessful matching of the unique identifier associated with the source endpoint received by the edge router.

12. The edge router of claim 10, wherein the unique identifier associated with the source endpoint comprises a discriminator as defined in Bidirectional Forward Detection (BFD) protocol.

13. The edge router of claim 10, the operations further comprising transmit a unique identifier associated with the edge router via a control plane established between the edge router and the controller.

14. The edge router of claim 13, the operations further comprising establish the control plane with the controller.

15. The edge router of claim 14, wherein the control plane is defined by secure control channels.

16. The edge router of claim 15, the operations further comprising advertise local routing information to the controller via the secure control channels.

17. The edge router of claim 16, the operations further comprising receive, from the controller via the secure control channels, local routing information of another endpoint.

18. One or more non-transitory computer-readable media containing instructions that, when executed by one or more processors, cause a system to perform operations comprising:

receive a data-session establishment packet transmitted by a source endpoint via a device configured to translate addresses from a public network address to a private network address, wherein the data-session establishment packet comprises a unique identifier associated with the source endpoint;

perform a matching operation to match the unique identifier associated with the source endpoint with a unique identifier known to a destination endpoint;

upon a successful matching of the unique identifier associated with the source endpoint with the unique identifier known to the destination endpoint, create a forwarding table entry for the destination endpoint based on a source address and source port associated with the source endpoint.

19. The computer-readable media of claim 18, the operations further comprising drop the data-session establishment packet upon an unsuccessful matching of the unique identifier associated with the source endpoint received by the edge router.

20. The computer-readable media of claim 18, the operations further comprising establish a control plane with the controller, the control plane defined by secure control channels.

* * * * *